United States Patent
Usuda et al.

(10) Patent No.: US 6,700,129 B1
(45) Date of Patent: Mar. 2, 2004

(54) ELECTRONIC BOARD SYSTEM AND COORDINATES-INPUTTING PEN

(75) Inventors: Yutaka Usuda, Kanagawa (JP); Yoshikazu Shinkai, Kanagawa (JP); Ichirou Takeuchi, Tokyo (JP); Yuji Tsukamoto, Tokyo (JP); Jun Namiki, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 78 days.

(21) Appl. No.: 10/048,557

(22) PCT Filed: Aug. 4, 2000

(86) PCT No.: PCT/JP00/05266
§ 371 (c)(1),
(2), (4) Date: May 7, 2002

(87) PCT Pub. No.: WO01/11554
PCT Pub. Date: Feb. 15, 2001

(30) Foreign Application Priority Data

Aug. 6, 1999 (JP) .......................................... 11/223741

(51) Int. Cl.⁷ .......................... G01N 21/86; G06M 7/00
(52) U.S. Cl. .................................. 250/559.29; 250/221
(58) Field of Search ................................ 356/614, 622, 356/6, 23; 250/221, 559.29, 559.38, 559.32, 206.1, 206.2

(56) References Cited

U.S. PATENT DOCUMENTS

| 4,217,649 A | 8/1980 | Doundoulakis |
| 4,294,543 A | 10/1981 | Apple et al. |
| 4,677,428 A * | 6/1987 | Bartholow .................. 345/180 |
| 5,900,943 A * | 5/1999 | Owen ......................... 356/406 |
| 6,100,538 A * | 8/2000 | Ogawa .................. 250/559.29 |
| 6,437,314 B1 * | 8/2002 | Usuda et al. ............... 250/221 |
| 6,441,362 B1 * | 8/2002 | Ogawa ....................... 250/221 |

FOREIGN PATENT DOCUMENTS

| DE | 198 10452 | 12/1998 |
| GB | 2263546 | 7/1993 |
| GB | 2306669 | 5/1997 |

* cited by examiner

*Primary Examiner*—Michael P. Stafira
(74) *Attorney, Agent, or Firm*—Mattingly, Stanger & Malur, P.C.

(57) ABSTRACT

The present invention transmits, to an electronic board controller 14, click signals generated upon manipulating multiple switches provided on a coordinates-inputting pen 13, timing signals upon detecting infrared scanning beams 18a and 18b, and the like without using a connecting wire.

Specifically, light-emitting elements are provided which can emit visible or infrared light to the coordinates-inputting pen 13. A timing signal upon detecting the infrared scanning beam with the pen and a click signal generated upon manipulating the switch on the pen are sent out on a modulated light 19 to be received by a light receiver 20 arranged at a fixed position and transmitted to the electronic board controller 14.

12 Claims, 7 Drawing Sheets

-----> Optical signal
———> Electric signal

Fig. 12A
Fig. 12B
Fig. 12C
Fig. 12D
Fig. 12E
Fig. 12F
Fig. 12G
Fig. 12H
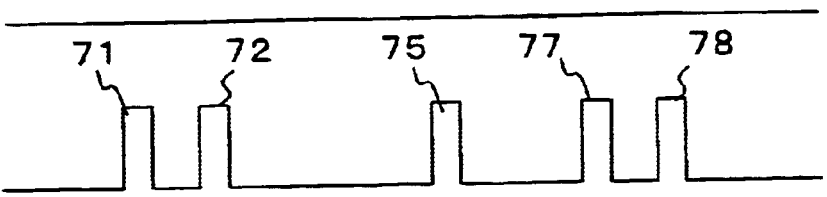
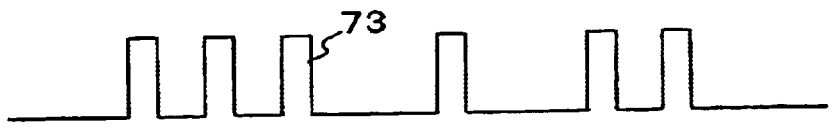
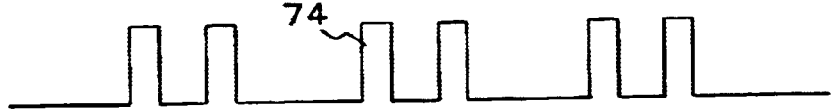
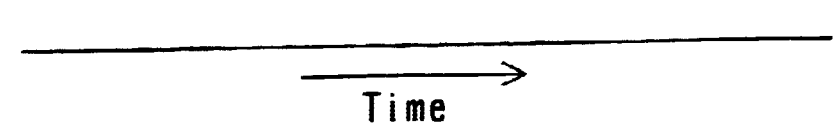

ELECTRONIC BOARD SYSTEM AND COORDINATES-INPUTTING PEN

TECHNICAL FIELD

The present invention relates to an electronic board system as an information input/output device used with a computer, and to a coordinates-inputting pen employing an infrared-ray detecting system used with the electronic board. More particularly, the present invention relates to processing of a signal indicating timing upon detecting a light beam with a pen and to processing of a switch signal generated upon clicking a button provided on the pen, in an electronic board which detects a location of a pen by scanning over the electronic board with a light beam.

BACKGROUND ART

An electronic board is an information input/output device used with computers, onto which a display output from the computer is projected from front or back of the board (screen) with a projector, while a pointed location or a trace of a coordinates-inputting pen on the board is incorporated as coordinate data.

With an electronic board employing a laser scanning system, a large display surface such as a screen is scanned with scanning beams generated by two laser scanners provided on upper left and right corners of the board. Examples of method for detecting a signal indicating timing upon capturing the scanning beams with the coordinates-inputting pen to specify the location of the coordinates-inputting pen include: (a) a method in which the scanning beams are reflected off a reflecting surface of a tip of the coordinates-inputting pen, and then the reflected beam is detected at a fixed point on the board; (b) a method in which an infrared signal from the coordinates-inputting pen is directed to a screen to detect the signal with a rear projector behind the screen; and (c) a method in which a scanning beam detection signal detected with the coordinates-inputting pen is sent out as an electric signal from the coordinates-inputting pen via a connecting wire.

However, the above-described methods for detecting the timing signals have the following defectives, respectively.

(a) According to the method of detecting a scanning beam reflected off the coordinates-inputting pen two infrared scanning beams have to spot on the coordinates-inputting pen to detect a pen-press. Thus, pen-press signals are received with low precision. A click button such as a mouse cannot be provided. When the coordinates-inputting pen is inclined, even by a slight angle, detection of the location of the pen becomes difficult. Since the height of the beam from the surface of the electronic board is critical for scanning over the electronic board, flatness of the surface of the electronic board and precise finishing of the optical scanning system need to strictly be managed, which results in high cost.

(b) The method of directing the infrared signal from the coordinates-inputting pen to the screen in front of the rear projector cannot be applied to a board using a front projector. In addition, a distance necessary for the light beam from the pen to approach the board differs depending on the optical structures including the screen (e.g., the screen size) and the internal rear projector. Accordingly, a design specification of the coordinates-inputting pen varies according to the specification of the rear projector, which results in high cost.

(c) According to the method of sending out the electronic signal from the coordinates-inputting pen via the connecting wire, the connecting wire often becomes an obstacle. Furthermore, in use for years, the connecting wire may wear and become useless due to disconnection or contact failure. When a front projector system is employed, the connecting wire may cast a shadow on the electronic board, which makes it hard for the user to see the screen.

The objective of the present invention is to provide an electronic board having none of the above-described conventional defectives, which is able to send, without a connecting wire, click signals generated upon manipulating multiple switches provided on the coordinates-inputting pen and a timing signal upon detecting the infrared scanning beam, to an electronic board controller provided at a fixed position on the board.

The present invention also has an objective of improving safety of the electronic board by limiting the infrared scanning beam for specifying the coordinates of the coordinates-inputting pen to be generated only at the time of drawing.

Another objective of the present invention is to provide an electronic board which incorporates data in a satisfactorily quick response to drawing with the coordinates-inputting pen and which accurately transfers a click switch output or a pen-press signal from the coordinates-inputting pen to an electronic board controller provided at a fixed position.

Yet another objective of the present invention is to provide an electronic board which is capable of accurately sending a click signal or a timing signal upon detecting an infrared scanning beam to an electronic board controller, even when the coordinates-inputting pen is inclined during the drawing.

DISCLOSURE OF THE INVENTION

According to the present invention, in order to accomplish the above-described objectives, light-emitting elements which can emit visible light or infrared light are provided on a coordinates-inputting pen. A timing signal upon detecting an infrared scanning beam with the coordinates-inputting pen and a click signal generated upon manipulating one of multiple switches provided on the pen are sent out on a modulated light from the light-emitting element so as to be received by a light receiver arranged at a fixed position. A plurality of light-emitting elements are provided on an external surface of the coordinates-inputting pen. The light-emitting elements used have broad spatial radiation pattern in the shaft direction of the pen so that the emitted light is sufficient to reach and activate the receivers at fixed points (e.g., provided along the periphery of the board) even if the pen is inclined during the drawing. Moreover, since the coordinates-inputting pen may rotate with respect to its axis upon use, the radiation pattern around the axis of the pen is determined considering the position and the number of the light receivers provided at fixed positions (e.g., provided along the periphery of the board).

However, simple use of light for signal transmission from the coordinates-inputting pen causes interference in the signal even if an influence by foreign light is limited by use of an optical filter or the like. Accordingly, signals to be transmitted are encoded to transmit modulated light. In addition, the wavelengths of the infrared scanning beams used for detecting the location of the pen and light used for signal transmission from the pen are made different. In order to prevent transmission error, in addition to the timing signal upon capturing the scanning light and the ON/OFF signal of the pen switch, recognition codes (ID bits) are also added to the signal to be transmitted from the pen.

As to the timing of capturing the scanning light, the light received by the coordinates-inputting pen needs to pass the light receiver provided at a fixed point and be modulated as a signal within an accuracy of micro-second order. According to the present invention, the timing signal upon capturing the scanning light with the coordinates-inputting pen, a click switch output of the pen and a pen-press signal are converted into simple codes so as to save time for modulating/demodulating. Moreover, in order to avoid the timing signal upon capturing the scanning light to be generated with time error, a code (bit) indicating timing of capturing the scanning light is added to the transmitted codes as a leading code. When this code (bit) is received, time count that has started from the reference point of the scanning is stopped (this count corresponds to a scanning angle), and the recognition codes (ID bits) attached to the transmitted codes are read. When the transmitted codes are judged valid, the time count value is subjected to the subsequent processing to specify the location coordinates of the coordinates-inputting pen. There may be, however, a slight time lag between the timing of capturing the scanning light and the stopping of the above-described time count (the count corresponding to the scanning angle). Therefore, the circuits have to be arranged to always give a constant time lag, and the time count has to be corrected. For example, when the time count is always 10 micro-seconds late, the time count value is always subtracted of 10 micro-seconds before specifying the scanning angle. Based on this scanning angle, the coordinates are calculated.

The light emission from the infrared scanning beam sources can be controlled by controlling the pen-press signal which is generated when the coordinates-inputting pen touches the board. By doing so, the infrared scanning beam sources emit light only when the coordinates-inputting pen is used with the electronic board for drawing (or writing), otherwise the sources do not emit light.

Specifically, an electronic board system of the present invention comprises: a board including first and second infrared scanning beam generators for alternately generating infrared scanning beams for rotational scanning; a coordinates-inputting pen including a photodetector for detecting the infrared scanning beams, a pen-press switch for detecting a pen-press against the board, an electronic circuit for outputting time sequential signals based on the detection signal from the photodetector and the ON/OFF signals of the pen-press switch, and a light-emitting element for generating an optical signal based on the time sequential signals output from the electronic circuit; a light receiver arranged at a position away from the coordinates-inputting pen, for detecting the optical signal generated from the light-emitting element of the coordinates-inputting pen; and an electronic board controller for calculating the coordinates of the coordinates-inputting pen based on the output of the light receiver.

Alternatively, an electronic board system of the invention comprises: a board including first and second infrared scanning beam generators for alternately generating infrared scanning beams for rotational scanning, a first reference sensor for generating a first reference signal upon detecting the infrared scanning beam generated by the first infrared scanning beam generator, and a second reference sensor for generating a second reference signal upon detecting the infrared scanning beam generated by the second infrared scanning beam generator; a coordinates-inputting pen including a photodetector for detecting the infrared scanning beam, a pen-press switch for detecting the pen-press against the board, an electronic circuit for outputting time sequential signals based on a detection signal from the photodetector and an ON/OFF signal from the pen-press switch, and a light-emitting element for generating an optical signal upon receiving the time sequential signals output from the electronic circuit; a light receiver arranged away from the coordinates-inputting pen for detecting the optical signal generated from the light-emitting element of the coordinates-inputting pen; and an electronic board controller for determining location coordinates of the coordinate inputting pen based on the outputs from the first and second reference sensors and the light receiver.

The coordinates-inputting pen may have a click switch, in which case, the electronic circuit outputs time sequential signals based on a detection signal from the photodetector, an ON/OFF signal from the pen-press switch and an ON/OFF signal from the click switch.

Preferably, the electronic circuit of the coordinates-inputting pen outputs encoded time sequential signals with obtained by adding recognition codes to the detection signal from the photodetector and the ON/OFF signal from the switch (e.g., a pen-press switch or a click switch). Addition of the recognition codes reduces transmission error of signals and enhances resistance against foreign noise.

Preferably, the electronic board controller calculates coordinates of the coordinates-inputting pen immediately upon receiving a code based on the detection signal from the photodetector of the coordinates-inputting pen, and affirm the calculated coordinates after confirming the recognition codes. By this configuration, time from the pen to capture the infrared scanning beam until the electronic board outputs the coordinate information of the pen can be shortened, thereby realizing rapid processing.

Wavelength $\lambda_1$ of the infrared light generated from first and second infrared scanning beam generators and wavelength $\lambda_2$ of the light generated from the light-emitting elements of the coordinates-inputting pen are made different, preferably. $\lambda_1 < \lambda_2$. If $\lambda_0 < \lambda_a < \lambda_1 < \lambda_b < \lambda_2$, and $\lambda_0$ is within a visible range, an optical filter which transmits only light with a wavelength longer than wavelength $\lambda_a$ is provided in front of the photodetector mounted on the coordinates-inputting pen while an optical filter which transmits only light with a wavelength longer than wavelength $\lambda_b$ is provided in front of the light receiver for receiving an optical signal generated from the light-emitting element of the pen. As a result, signals do not interfere with each other as caused by positions or light intensities of the light sources.

The electronic board controller allows a light source in the infrared scanning beam generator to emit light when the electronic board controller judges that the pen-press signal is ON, and the electronic board controller suspends the light source in the infrared scanning beam generator from emitting light when the electronic board controller judges that the pen-press signal has been OFF for a predetermined time. Preferably, the infrared scanning light is emitted when the coordinates-inputting pen is touching the board for drawing (or writing) and is suspended when the pen leaves the board after the drawing (or writing).

Desirably, the electronic board controller suspends a light source in the first infrared scanning beam generator from emitting light while allowing a light source in the second infrared scanning beam generator to emit light when the electronic board controller judges that a photodetecting signal is generated from the coordinates-inputting pen during the generation of the infrared scanning beam by the first infrared scanning beam generator. The electronic board controller suspends the light source in the second infrared scanning beam generator from emitting light while allowing the light source in the first infrared scanning beam generator to emit light when the electronic board controller judges that a photodetecting signal is generated from the coordinates-inputting pen during the generation of the infrared scanning beam by the second infrared scanning beam generator. By such control, the response for detecting the coordinates of the coordinates-inputting pen can be enhanced, as compared to the case where the first and second infrared scanning beam generators alternately generate scanning beams at predetermined cycles.

The electronic board system of the invention may further comprise: a computer for receiving the coordinates information of the coordinates-inputting pen from the electronic board controller; and a display means connected to the computer for displaying a mark on the board based on the coordinates information.

A coordinates-inputting pen of the invention is used for inputting coordinates by detecting two infrared scanning beams alternately rotationally scanning in parallel to a surface of a board for specifying location coordinates of a pen. This coordinate inputting pen comprises: a shaft; a light receiver arranged on the tip of the shaft such that it can move in the shaft direction; a pen-press switch for generating ON/OFF signal according to the position of the light receiver in the shaft direction; an electronic circuit for outputting encoded time sequential signals obtained by adding recognition signals to the detection signal of the infrared scanning beam by the light receiver and the ON/OFF signal from the pen-press switch; and a light-emitting element for generating an optical signal in response to the time sequential signals output from the electronic circuit.

The light receiver may comprise a transparent conical member with a rough surface and a light-emitting element for detecting an infrared ray scattered inside the conical member.

The coordinates-inputting pen of the invention my further comprise a click switch. In this case, the electronic circuit outputs encoded time sequential signals obtained by adding recognition signals to the detection signal from the light receiver, an ON/OFF signal of the pen-press switch, and the ON/OFF signal of the click switch.

BRIEF DESCRIPTION OF THE DRAWINGS

FIGS. 12A to 12H are diagrams showing codes of the optical signals that vary depending on the states of the coordinates-inputting pen.

BEST MODE FOR CARRYING OUT THE INVENTION

Hereinafter, embodiments of the present invention will be described with reference to the drawings.

Figure 1:
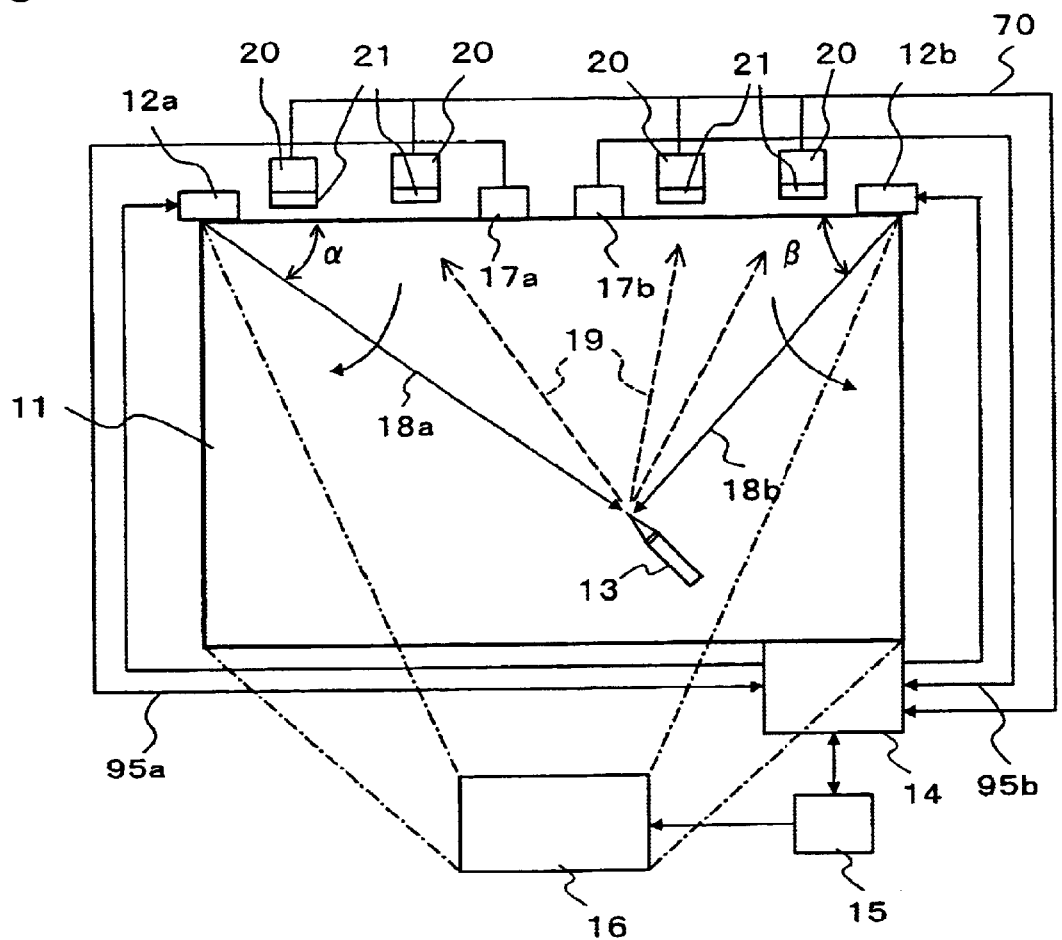
FIG. 1 is a block diagram showing an exemplary structure of an infrared ray detection electronic board system according to the invention.

FIG. 1 is a block diagram showing an exemplary configuration of an infrared ray detection electronic board system according to the invention. The infrared ray detection electronic board system shown in the figure is provided with: a board (display board) 11 for displaying characters and a graphic screen; infrared scanning beam generators 12a and 12b at the upper left and right corners of the board 11; reference sensors 17a and 17b for detecting infrared scanning beams 18a and 18b generated by the infrared scanning beam generators 12a and 12b, respectively, which are rotationally scanning in directions represented by the arrows shown in the figure, so as to generate location reference signals; a coordinates-inputting pen 13 for detecting the infrared scanning beams 18a and 18b so as to generate a detection signal as an optical signal 19; light receivers 20 for detecting the optical signal 19 generated by the coordinates-inputting pen 13; an electronic board controller 14 for determining the coordinates of the location of the coordinates-inputting pen and for controlling light sources in the infrared scanning beam generators 12a and 12b; a personal computer (hereinafter, referred to as a "PC") 15 for displaying a trace of the coordinates-inputting pen 13; and a projector 16 for displaying. The light receivers 20 need to be provided in multiple in order to always effectively capture the optical signal 19 from the coordinates-inputting pen 13 regardless of the behavior of the coordinates-inputting pen 13 and the rotational movement of the coordinates-inputting pen 13 with respect to the axis thereof.

Figure 2:
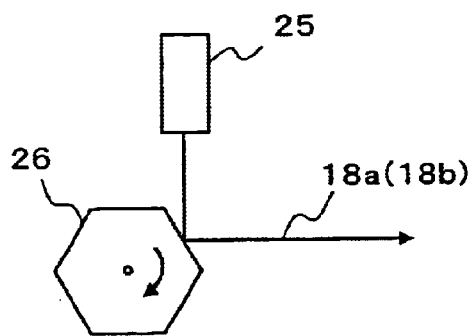
FIG. 2 is a schematic view showing an exemplary structure of the infrared scanning beam generators.

For example, as schematically shown in FIG. 2, the infrared scanning beam generators 12a and 12b may each comprise an infrared laser diode 25 as a light source and a polygon mirror 26 which rotates at a constant rate for a beam scan. The infrared scanning beam generators 12a and 12b alternately generate infrared scanning beams 18a and 18b, which rotationally scan over the surface of the board 11 at a constant angular velocity. Specifically, while the infrared scanning beam 18a generated by one of the infrared scanning beam generator 12a rotationally scans over the surface of the board 11, the other infrared scanning beam generator 12b does not generate an infrared scanning beam. On the other hand, while the infrared scanning beam 18b generated by one of the infrared scanning beam generator 12b is rotationally scanning over the surface of the board 11, the infrared scanning beam generator 12a does not generate an infrared scanning beam. Accordingly, the coordinates-inputting pen 13 does not receive two infrared scanning beams 18a and 18b at the same time.

As will be described later, the coordinates-inputting pen 13 generates an optical signal 19 which has a different wavelength from those of the infrared beams generated by the infrared scanning beam generators 12a and 12b. Optical filters 21 which do not allow the wavelength of the infrared scanning beams 18a and 18b to pass therethrough but only the wavelength of the optical signal 19, are provided in front of the multiple light receivers 20 at suitable locations (e.g., upper area of the board 11). As a result, the light receivers 20 detect only the optical signal 19 generated by the coordinates input pen 13. The board 11 may be a screen used with a rear projector, a screen used with a front projector, a plasma display, a flat-type CRT (cathode ray tube), a generally-used white or black board without a displaying function, or any other board.

Figure 3:
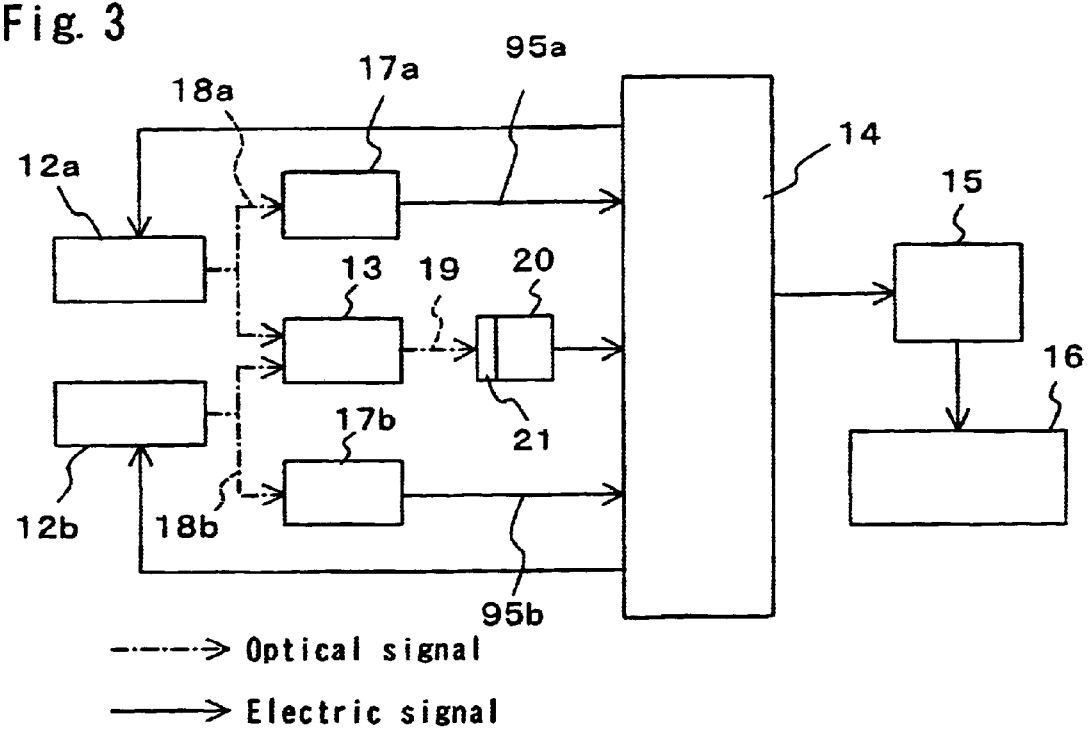
FIG. 3 is a signal flow chart for illustrating the flow of the signals.

FIG. 3 is a signal flow chart for illustrating the flow of the signals. The infrared scanning beam 18a generated by the infrared scanning beam generator 12a at the upper left corner (FIG. 1) is detected by the reference sensor 17a and the coordinates-inputting pen 13, while the infrared scanning beam 18b generated by the infrared scanning beam generator 12b at the upper right corner (FIG. 1) is detected by the reference sensor 17b and the coordinates-inputting pen 13. The coordinates-inputting pen 13 sends out detection signals for the infrared scanning beams 18a and 18b on the optical signal 19 to be received by the light receivers 20.

Detections signals 95a and 95b from the reference sensors 17a and 17b and detection signals 70 from the light receivers 20 are input into the electronic board controller 14. Based on these signals, angles α and β (FIG. 1) indicating an expected location of the coordinates-inputting pen 13 are determined, thereby determining the location of the coordinates-inputting pen 13 on the board 11. The location information of the coordinates-inputting pen 13 is processed by the PC 15 so as to display the trace of the coordinates-inputting pen 13 on the board 11 by the screen display projector 16. Furthermore, the electronic board controller 14 controls the infrared scanning beam generators 12a and 12b based on the detection signals from the reference sensors 17a and 17b and the detection signals from the light receivers 20, to alternately generate left and right infrared scanning beams 18a and 18b as well as to stop scanning with the infrared scanning beam 18a and 18b when the coordinates-inputting pen is not in use for drawing.

Figure 4:
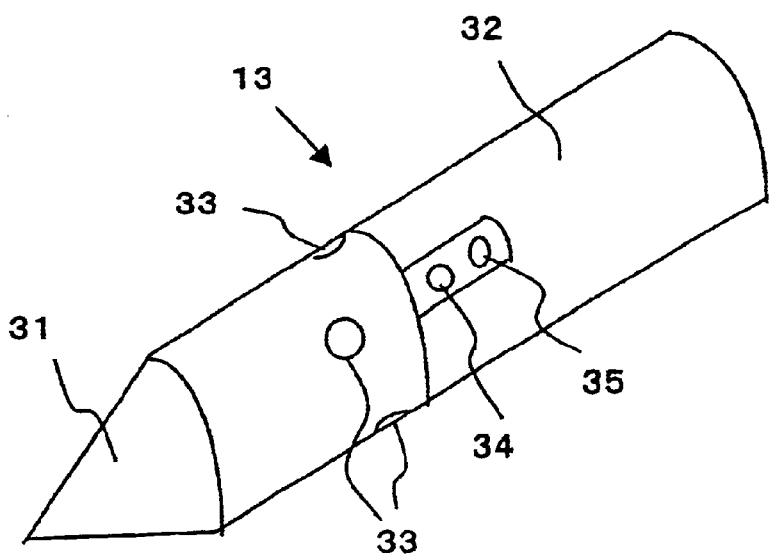
FIG. 4 is a schematic view showing an exemplary structure of the coordinates-inputting pen.

FIG. 4 shows an appearance of an exemplary coordinates-inputting pen of the present invention. The coordinates-inputting pen 13 includes an infrared scanning beam receiver 31 at a tip thereof and a plurality of light-emitting elements 33 on its shaft 32. The shaft 32 is provided with a first click switch 34 and a second click switch 35. Although the light-emitting elements 33 are located close to the tip of the coordinates-inputting pen in FIG. 4, they may also be provided at the tip-end side or the tail-end side (the opposite end from the tip) of the grip of the coordinates-inputting pen. In brief, the light-emitting elements 33 may be provided in any arrangement as long as the optical signals 19 generated by the light-emitting elements 33 are always detected by the light receivers 20. The first click switch 34 and the second click switch 35 provided on the shaft 32 can be used to command operation similar to left click, right click and double click of a mouse of a personal computer. Moreover, these switches may be assigned with any functions such as a function of "enter" key of a PC keyboard.

Figure 5:
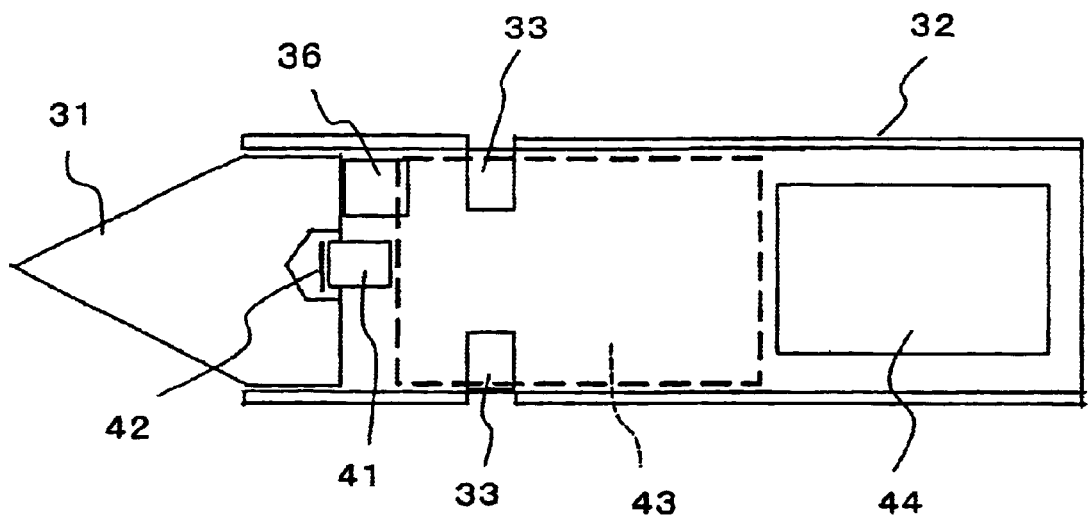
FIG. 5 is a schematic view showing an example of an internal structure of the coordinates-inputting pen.

FIG. 5 is a schematic view showing an exemplary internal structure of the coordinates-inputting pen 13. The infrared scanning beam receiver 31 is movably fit into the tip of the pen shaft 32 in the shaft direction. At the center of and behind the infrared scanning beam receiver 31, a photodiode (photodetector) 41 is fixedly provided together with an optical filter 42. A part of the back surface touches a pen-press switch 36 fixed to the shaft 32. Accordingly, when the tip (the infrared scanning beam receiver 31) of the coordinates-inputting pen 13 is pressed against the board 11, the pen-press switch 36 is switched "ON". When the coordinates-inputting pen 13 leaves the board 11 after drawing, the pen-press switch 36 is switched "OFF". Whether the coordinates-inputting pen 13 is in a drawing state or not can be evaluated according to the "ON" and "OFF" states of the pen-press switch 36. The pen shaft 32 accommodates the plurality of light-emitting elements 33 arranged so as to emit light outward, an electronic circuitry 43 for processing signals from the photodiode 41 or the pen-press switch 36 to direct the light-emitting elements 33 to emit light, and a battery 44 as a power source.

Figure 6:
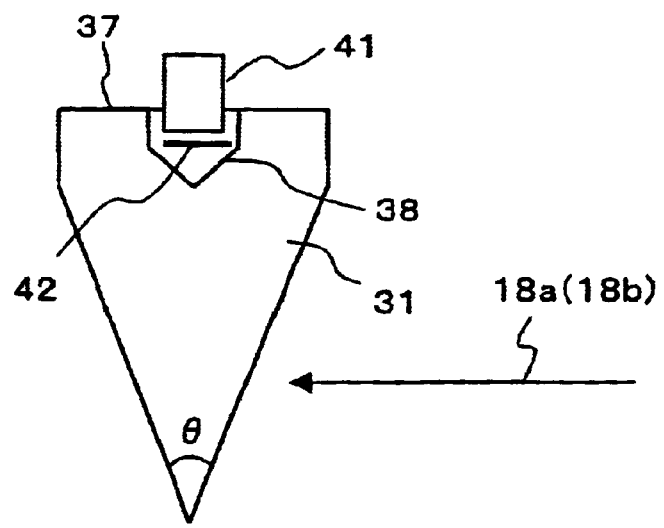
FIG. 6 is a detailed view of an infrared scanning beam receiver.

FIG. 6 is a detailed view of the infrared scanning beam receiver 31. The infrared scanning beam receiver 31 shown in the figure is a generally conical block made of a material that transmits an infrared ray such as plastic (e.g., acrylic material) or glass. The surface of the beam receiver 31 is made rough so as to scatter the infrared scanning beams 18a and 18b upward (along the shaft direction) within the infrared scanning beam receiver 31. A bottom face 37, i.e., the base of the corn, is provided with a small cavity 38 into which the photodiode 41 is imbedded such that its light receiving side is faced down. In front of the photodiode 41, an optical filter 42 that only transmits the infrared scanning beams 18a and 18b but cuts visible light is provided.

The infrared scanning beam 18a (18b) that intersects with the coordinates-inputting pen 13, is scattered on the rough surface of the conical infrared scanning beam receiver 31 at the tip of the coordinates-inputting pen and generally proceeds upward (along the shaft) inside the infrared scanning beam receiver 31 to be received by the photodiode 41. Since the filter 42 that transmits only an infrared ray but visible light is provided in front of the light receiving surface of the photodiode 41, the infrared scanning beams 18a and 18b can accurately be detected without being influenced by the environment where the coordinates-inputting pen 13 is used, such as room light.

Figure 7A:
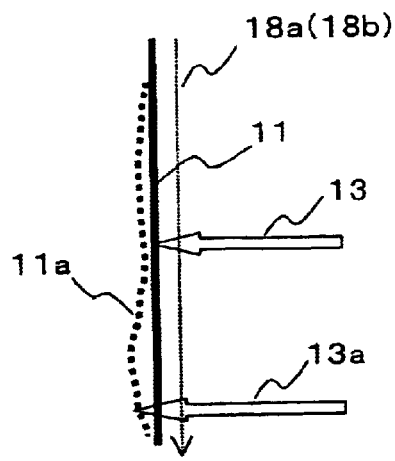
FIGS. 7A and 7B are views for illustrating light receiving states of the infrared scanning beams by the coordinates-inputting pen.
Figure 7B:
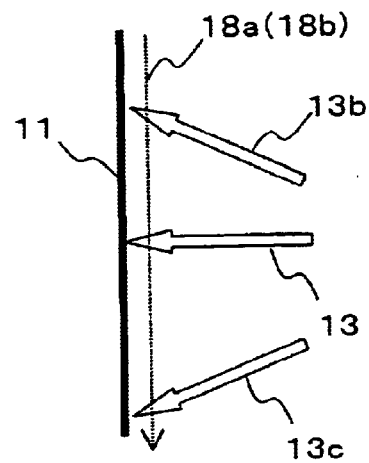

FIGS. 7A and 7B are diagrams for illustrating states of receiving the infrared scanning beams 18a and 18b with the coordinates-inputting pen 13 exemplified in FIGS. 4 to 6. FIG. 7A shows a light receiving state where there is a distortion in the surface of the board 11. FIG. 7B shows a light receiving state where the coordinates-inputting pen 13 is inclined.

As shown in FIG. 7A, the infrared scanning beam 18a (18b) is designed such that it is detected when the coordinates-inputting pen 13 is in a predetermined alignment with the board 11. If the board 11 is distorted as represented by a broken line 11a as it should be flat as represented by a solid line, the coordinates-inputting pen 13a is misaligned with respect to the scanning plane made by the infrared scanning beam 18a (18b). However, by making the infrared scanning beam receiver (the head of the arrow) 31, for example, to about 2 cm in length, unevenness of the board that can naturally occur can be accepted. As shown in FIG. 7B, the coordinates-inputting pen 13 may be inclined from a vertical position with respect to the board 11, for example, as pen 13b or 13c. By making the infrared scanning beam receiver (the head of the arrow) 31, for example to about 2 cm in length, the infrared scanning beam 18a (18b) can properly be received and detected even when the coordinates-inputting pen 13 is inclined by as large as about 45°.

When the coordinates-inputting pen is used for handwriting letters or drawing figures, distortion or deformation of the board (e.g., screen) or inclination of the pen with respect to the board is unavoidable. With regard to these points, since the infrared scanning beam receiver 31 (i.e., infrared scanning beam detector) of the coordinates-inputting pen 13 exemplified in FIGS. 4 to 6 can be made long along the axis, the infrared scanning beams 18a and 18b can always be detected even if the board 11 is distorted or deformed or even if the inputting pen 13 is inclined, and the trace of the coordinates-inputting pen 13 can accurately be reproduced.

Figure 8:
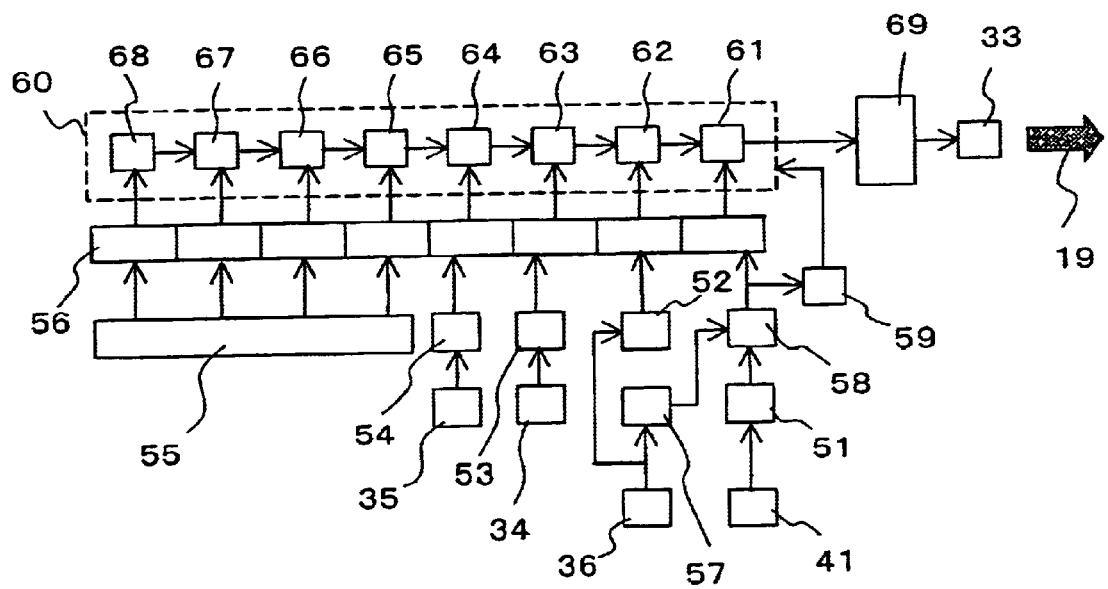
FIG. 8 is a schematic view showing an exemplary electronic circuit provided inside the coordinates-inputting pen.

FIG. 8 is a schematic view showing an exemplary electronic circuitry mounted inside the coordinates-inputting pen. A waveform of a detection signal from the photodiode 41 of the coordinates-inputting pen 13 is shaped by a waveform shaping circuit 51 and input into an OR circuit 58. A waveform of an ON signal from the pen-press switch 36 is shaped at a waveform shaping circuit 52 and input into a buffer resister 56. The ON signal from the pen-press switch 36 is also input into a clipping circuit 57.

Figure 9A:
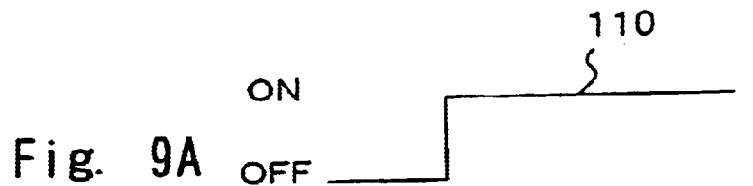
FIGS. 9A to 9C are diagrams for illustrating the functions of a clipping circuit.
Figure 9B:
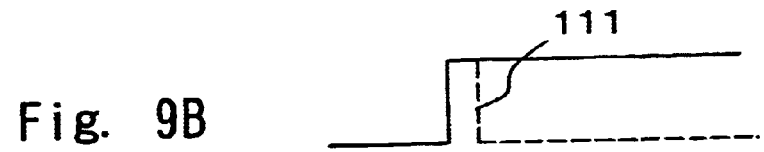
Figure 9C:

FIGS. 9A to 9C are diagrams for illustrating the functions of the clipping circuit 57. When the coordinates-inputting pen 13 is pressed against the board 11, the pen-press switch 36 continuously outputs ON signals 110 as shown in FIG. 9A. The clipping circuit 57 clips out the ON signals 110 from the pen-press switch 36 as represented by a broken line 111 in FIG. 9B. As a result, a pulse signal 112 shown in FIG. 9C is output from the clipping circuit 57.

The output from the clipping circuit 57 is logically summed with the output from the waveform shaping circuit 51 at the OR circuit 58. The output from the OR circuit 58 is input into a buffer resister 56 as well as into a shift resister driving circuit 59. The shift resister driving circuit 59 determines timing to output signals stored in respective elements 61 to 68 of the shift resister 60 as time series signals. The outputs from the clipping circuit 57 and the waveform shaping circuit 51 are logically summed so that an optical signal 19 of a predetermined format (in the figure, an 8-bit code signal) is sent even when a pen-press occurs under a state where both left and right infrared scanning beams 18a and 18b are off following a predetermined time period of no pen-press signal response.

A waveform of an ON signal from the first click switch 34 is shaped at a waveform shaping circuit 53 while a waveform of an ON signal from the second click switch 35 is shaped at a waveform shaping circuit 54. Both outputs are input into the buffer resisters 56. A recognition code generator 55 inputs a previously set 4-bit recognition codes into the buffer resisters 56. Signals stored in the buffer resisters 56 are transferred to the elements 61 to 68 of the shift resister 60 at a predetermined timing. Once the shift resister 60 receives the signal from the shift resister driving circuit 59, it sends the signals stored in the elements 61 to 68 as the time series signals to a light-emitting element driving circuit 69. The light-emitting element driving circuit 69 drives the light-emitting element 33 and outputs the optical signal 19.

Figure 10A:
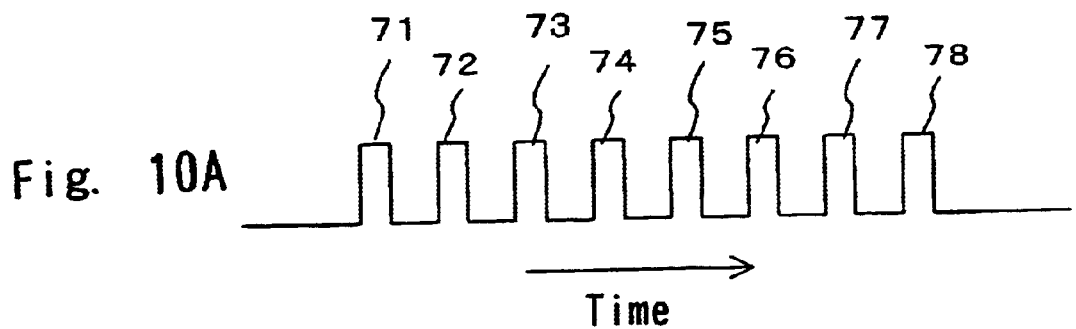
FIGS. 10A to 10B are schematic diagrams showing examples of modulations of an optical signal sent from a light-emitting element.
Figure 10B:
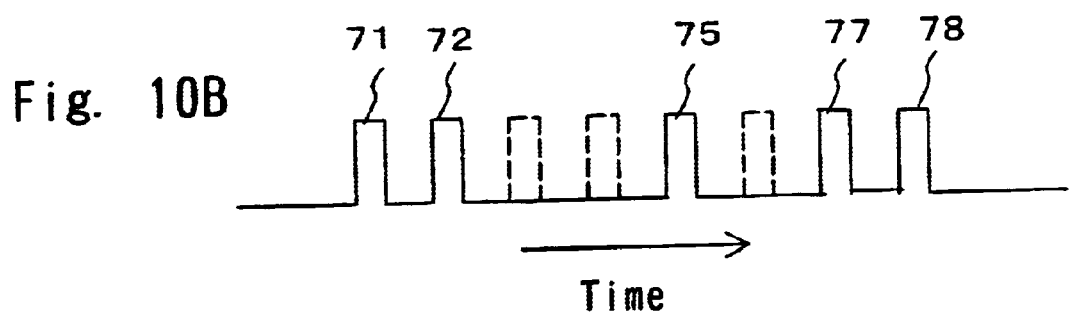

FIGS. 10A and 10B are schematic diagrams showing an example of a modulation of the optical signal 19 sent from the light-emitting element 33 mounted on the coordinates-inputting pen 13. In the figures, the course of time runs from left to right. FIG. 10A is a schematic diagram shoving relative timing of codes which are, starting from the left, a timing code 71 for indicating that the photodiode 41 of the coordinates-inputting pen 13 has detected the infrared scanning beams 18a (18b), a pen-press code 72, a first click switch ON code 73, a second click switch ON code 74 and first to fourth code recognition codes 75 to 78. The code recognition codes 75 to 78 are added for excluding misinformation caused by noise or the like. In the case where the four codes (bits) 71 to 74 preceding the code signals are input as caused by some foreign signals without being immediately followed by the predetermined code recognition codes 75 to 78 (e.g., "1011"), an ID confirmation signal which will be described later is not generated, and thus the input signals are regarded invalid and not incorporated.

Of the codes 71 to 78, the code recognition codes 75 to 78 are fixed codes to the coordinates-inputting pen 13 and are invariable during the use of the pen 13, whereas the rest of the codes 71 to 74 alter according to the state of the pen 13. When the codes are ON, optical pulses are generated at the respective timing positions shown in the figure preceding the code recognition codes 75 to 78, and when the codes are OFF, optical pulses are not generated at the respective timing positions. For example, if the code recognition codes are "1011" and the photodiode 41 receives the infrared scanning beam 18a while the pen-press switch 36 is ON, and the first and the second click switches 34 and 35 are OFF, an. optical signals 19 where only codes 71, 72, 75, 77 and 78 are ON is sent from the light-emitting element 33 of the pen 13 as shown in FIG. 10B.

The pen-press signal indicates that the coordinate inputting pen is in use for drawing, and is generated when the tip of the pen is pressed against the board and switches the pen-press switch 36 ON. The pen-press signal is used for controlling the light emission of laser diodes 25 provided in the infrared scanning beam generators 12a and 12b. When the electronic board controller 14 is switched on, the polygon mirrors 26 in the infrared scanning beam generators 12a and 12b schematically shown in FIG. 2 begin and continue to rotate at a constant angular velocity until the electronic board controller 14 is switched off. However, the infrared laser diodes 25 do not emit light by switching the electronic board controller 14 but only when an actual drawing with the coordinates-inputting pen 13 takes place and stops emitting light when the drawing is finished.

The light emission by the infrared laser diodes 25 during the drawing can be controlled by utilizing the pen-press signal. Specifically, the electronic board controller 14 controls such that the infrared laser diodes 25 of the left and right infrared scanning beam generators 12a and 12b are alternately allowed to emit light when the pen-press signal is ON, and to suspend the infrared laser diodes 25 from emitting light when the pen-press signal is OFF. Preferably, the order of the alternate light emission of the infrared laser diodes 25 of the two infrared scanning beam generators 12a and 12b is predetermined, and the light emission of the infrared laser diodes 25 of the left and right infrared scanning beam generators 12a and 12b are controlled in pair. For example, one control set may be as follows: When the pen-press signal is ON, first, the infrared laser diode 25 of the infrared scanning beam generator 12a at the upper left corner is allowed to emit light. Then, the infrared laser diode 25 at the upper left corner is suspended from emitting light and the infrared laser diode 25 of the infrared scanning beam generator 12b at the upper right corner is allowed to emit light. Finally, the infrared laser diode 25 of the infrared scanning beam generator 12b at the upper right corner is suspended from emitting light.

When the pen-press signal is ON, the electronic board controller 14 alternately turns the infrared laser diodes of the left and right infrared scanning beam generators 12a and 12b ON and OFF. Specifically, the infrared scanning beam 18a from the infrared scanning beam generator 12a at the upper left corner is received by the coordinates-inputting pen 13 via the left reference sensor 17a upon which the infrared laser diode of the infrared scanning beam generator 12a at the upper left corner is suspended and the infrared laser diode 25 of the infrared scanning beam generator 12b at the upper right corner is immediately allowed to emit light. Similarly, the infrared scanning beam 18b from the infrared scanning beam generator 12b at the upper right corner is received by the coordinates-inputting pen 13 via the right reference sensor 17b upon which the infrared laser diode of the infrared scanning beam generator 12b at the upper right corner is suspended and the infrared laser diode 25 of the infrared scanning beam generator 12a at the upper left corner is immediately allowed to emit light. By controlling the left and right infrared scanning beam generators 12a and 12b as described above the location coordinates of the coordinates-inputting pen 13 can be determined without a time lag.

When the coordinates-inputting pen 13 is used to draw a figure or write letters, the pen tip will inevitably momentarily leave the board. The pen-press switch 36 is switched OFF when the coordinates-inputting pen 13 leaves the board 11. However, if the infrared scanning beams 18a and 18b are suspended everytime the pen 13 momentarily leaves the board 11, the detection of the coordinates of the pen 13 may be incomplete so that the electronic board controller 14 cannot reproduce accurate reproduction of the trace of the coordinates-inputting pen 13. Therefore, the electronic board controller 14 does not immediately suspend the infrared laser diodes 25 of the infrared scanning beam generators 12a and 12b from emitting light, but suspends only after the pen-press signal is OFF for a predetermined time period (e.g., 5 seconds), judging that the drawing operation has finished.

Figure 11:
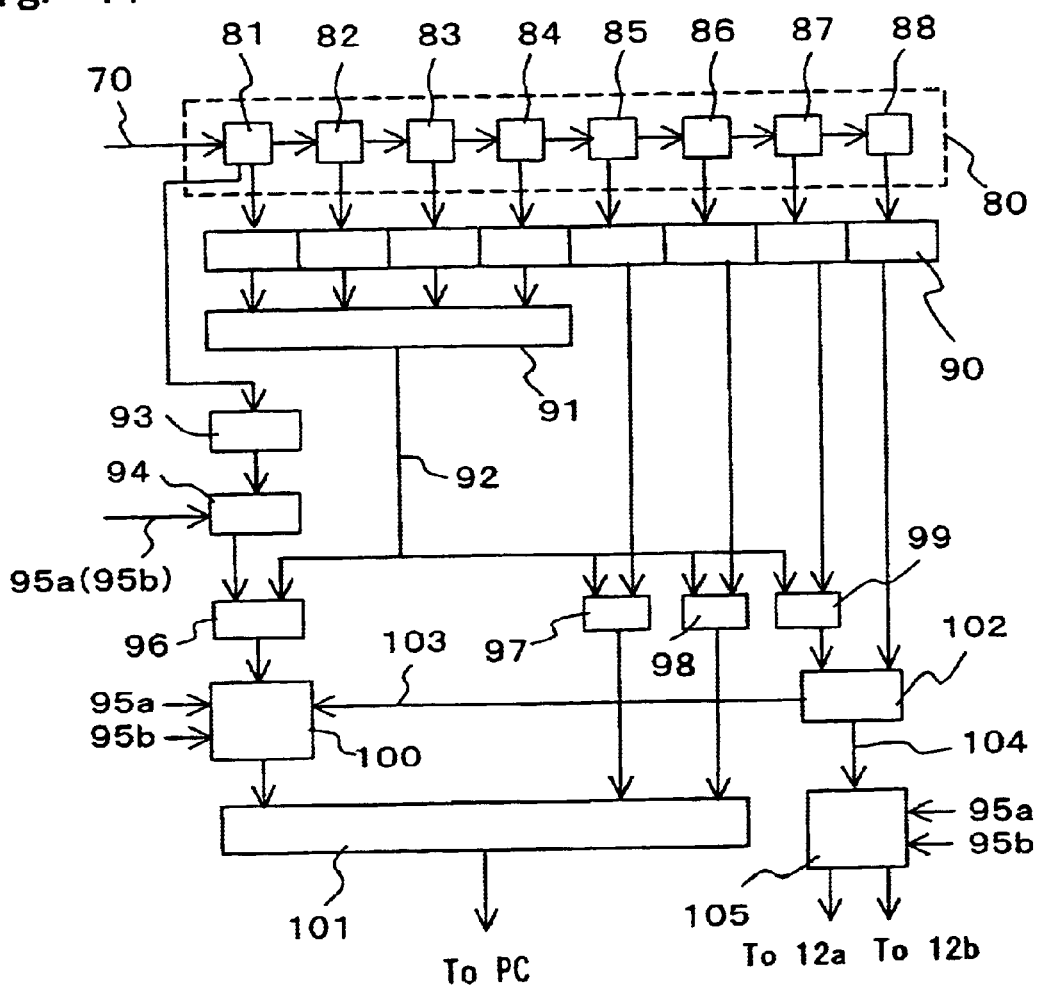
FIG. 11 is a block diagram conceptually showing an example of code demodulating circuitry mounted on the electronic board controller.

FIG. 11 is a block diagram conceptually showing an example of a code demodulating circuitry mounted on the electronic board controller 14 for demodulating the codes of the optical signal 19 that has been modulated as described with reference to FIGS. 10A and 10B.

The modulated optical signal 19 is received by the light receiver 20, and a detection signal 70 which is a converted electric signal sequentially passes through the elements 81 to 88 of an eight-element shift resister 80. Among the codes, only the leading timing signal 71 is sent, as soon as it is input into the shift resister 80, to a time counter 94 via a resister 93. The time counter 94 is activated and starts counting time by a reference timing signal 95a which is generated from the reference sensor 17a as the reference sensor 17a detects the infrared scanning beam 18a, or a reference timing signal 95b which is generated from the reference sensor 17b as the reference sensor 17b detects the infrared scanning beam 18b. The time count stops by the timing signal 71 sent via the resister 93. The time count value of the time counter 94 is directly sent to a resister 96 as interim angle information between the reference point to the coordinates-inputting pen, and is stored in the resister 96 until a later described ID confirmation signal 92 is generated. The transmission codes sequentially occupies the elements 81 to 88 of the eight-element shift resister 80 and are accumulated in a buffer resister 90 at the same time. An AND circuit 91 incorporates predetermined first to fourth recognition codes as circuits. When the last four digits (bits) of the buffer resister 90 conform to the predetermined recognition codes 75 to 78, an ID confirmation signal 92 is sent out from the AND circuit 91. The resister 96, upon receiving the ID confirmation signal 92, sends out the stored count value to an operation circuit 100, as established information of the angle of the pen location. The operation circuit 100 determines the location coordinates of the pen based on the above-described time count value and sends the information to a transmitter 101 if a valid pen-press signal 103 has been input into the operation circuit 100 from a later-described logic circuit 102.

The time count value of the time counter 94, whose counting took place by the reference timing signal 95a from the reference sensor 17a and stopped by the timing signal 71 contained in the signal 70, corresponds to angle α shown in FIG. 1. Similarly, the time count value of the time counter 94, whose counting took place by the reference timing signal 95b from the reference sensor 17b and stopped by the timing signal 71 contained in the signal 70, corresponds to angle β shown in FIG. 1. When the electronic board controller receives the timing code 71 on the optical signal 19 from the coordinates-inputting pen 13, the timing code is processed as information indicating an angle determined by the reference sensor that has just detected the light.

Based on the information of angles α and β, the operation circuit 100 calculates x-y coordinates of the coordinates-inputting pen 13 where, for example, the upper left corner of the board 11 being the origin, the x-axis being positive towards right and the y-axis being positive downward. The x-y coordinates of the coordinates-inputting pen 13 may be calculated by the following expressions where a is the distance between the left and right infrared scanning beam generators 12a and 12b.

$$x = a \cdot \tan \beta / (\tan \alpha + \tan \beta)$$

$$y = x \cdot \tan \alpha$$

The x-y coordinates information of the coordinates-inputting pen 13 calculated by the operation circuit 100 is output to the transmitter 101 upon receiving the valid pen-press signal 103 from the logic circuit 102. When the valid pen-press signal 103 is not generated by the logic circuit 102, the signal incorporated by the resister 93 should be a signal other than the timing code 71 and the output from the operation circuit 100 should not indicate the x-y coordinates of the coordinates-inputting pen 13. Accordingly, the output from the operation circuit 100 is not input into the transmitter 101.

When the drawing takes place in a state where the left and right infrared scanning beams 18a and 18b are not generated, a timing code is first pseudo-generated in response to the ON signal of the pen-press switch 36 as described above. When this pseudo-generated timing code is incorporated by the resister 93 of the demodulating circuity (FIG. 11), the operation circuit 100 calculates coordinates defined based on α=0 and β=0 (FIG. 1) since the reference timing signals 95a and 95b are not generated and the time counter 94 has not yet started counting. However, since this coordinates information is invalid and does not correspond to the actual coordinates of the pen, the operation circuit 100 does not output the information to the transmitter 101.

Whether the coordinates information is invalid or not is judged by referring to the reference timing signal 95a (95b) at the operation circuit 100. Specifically, when a time count value is input into the operation circuit 100 from the resister 96 with no output of the reference timing signal 95a (95b), the time count value is judged invalid. Moreover, if the reference timing signal 95a (95b) can be referred to at the operation circuit 100, the time count value input from the resister 96 can be readily confirmed whether it corresponds to either angle α or β (FIG. 1).

The judgment of validity of the coordinates information at the operation circuit 100 can be accomplished according to the calculated coordinate values, or according to the states of the time serial signal input to the operation circuit 100. When the coordinates-inputting pen 13 is used for drawing, a series of signals are time sequentially input to the operation circuit 100 from the resister 96. No pseudo-timing signal should be contained in this series of signals. A pseudo-timing signal caused by the ON signal of the pen-press switch 36 is generated when there is no signal input from the resister 96 for a while (a time longer than the duration of the pen-press OFF signal necessary for the electronic board controller 14 to suspend the infrared laser diodes 25 of the infrared scanning beam generators 12a and 12b from emitting light) and a series of time sequential signals are input. The operation circuit 100 monitors time intervals of the signals supplied from the resister 96 so that when a series of signals are input after an interval longer than the predetermined interval from the previous signal input, the first signal is judged to be based on a pseudo timing signal and is not read.

Returning to FIG. 11, the code maintained in a resister 99 is output to the logic circuit 102 as a pen-press code, upon receiving the ID confirmation signal 92. The logic circuit 102 generates a valid pen-press signal 103 and a pen-press/timing signal 104 by AND operation of the leader code of the buffer resister 90 and the output from the resister 99. The valid pen-press signal 103 is input into the operation circuit 100 as described above while the pen-press/timing signal 104 is input into the infrared source controller 105.

Codes maintained in the resisters 97 and 98 are also output to the transmitter 101 as an ON signal of the second click switch and an ON signal of the first click switch, respectively. The transmitter 101 transmits these signals to the PC 15. The PC 15 displays the location or the trace of the coordinates-inputting pen 13 on the board 11 with the projector 16 based on the pen location information. Moreover, utilizing the ON/OFF states of the first and second click switch signals, operations corresponding to left double click or right click as with a PC mouse manipulation are conducted.

The infrared source controller 105, by monitoring the pen-press/timing signal 104, suspends the infrared scanning beam generators 12a and 12b from generating the infrared scanning beams 18a and 18b a predetermined time (e.g., 5 seconds) after the last drawing (or writing) has ended (i.e., after the pen-press switch 36 was switched off). When the pen-press switch 36 is switched ON after suspending the generation of the infrared scanning beams, the infrared scanning beams 18a and 18b are pseudo-received owing to the clipping circuit 57. As a result, a, code signal is established and an optical signal 19 is transmitted, whereby the infrared scanning beams 18a and 18b are immediately generated and enters into a normal operation state. The infrared source controller 105 also receives reference timing signals 95a and 95b generated by the reference sensors 17a and 17b. When the infrared source controller 105 receives the pen-press/timing signal 104 from the logic circuit 102, it suspends the infrared laser diode of the infrared scanning beam generator corresponding to the, reference timing signal that has just been input thereto, and allows the other infrared laser diode to emit light, thereby alternately generating left and right infrared scanning beams 18a and 18b.

The light emission control of the infrared laser diodes by the infrared source controller 105 is carried out considering the alignments between the infrared scanning beam generators 12a and 12b and the reference sensors 17a and 17b, and rotational scanning directions of the infrared scanning beams 18a and 18b. For example, for setting the alignments of the reference sensors 17a and 17b and the rotational scanning directions of the infrared scanning beams 18a and 18b as shown in FIG. 1, it is necessary that, first, the reference timing signal 95a (95b) is output, and then the timing code of detecting the infrared scanning beam 18a (18b) is transmitted from the coordinates-inputting pen 13 in order to determine the angles α and β. Accordingly, this factor should also be considered upon controlling the light emissions of the infrared laser diodes by the infrared source controller 105.

Specifically, depending on the rotational state of the polygon mirror 26 at the infrared scanning beam generator 12a (12b) and the timing for directing the infrared laser diodes 25 to emit light from the infrared source controller 105, the infrared scanning beam 18a (18b) may start the rotational scanning at the midpoint between the reference sensor 17a (17b) and the coordinates-inputting pen 13. In this case, the optical signal 19 containing the timing code 71 is sent out from the coordinates-inputting pen 13 without waiting for an input of the reference timing signal 95a (95b) from the reference sensor 17a (17b) to the electronic board controller 14. In the electronic board controller 14 that detected the timing code 71, the pen-press/timing signal 104 is generated at the logic circuit 102. If the infrared source controller 105 suspends the infrared laser diode 25 from emitting light based on this pen-press/timing signal 104, angular information necessary for coordinate calculation of the coordinates-inputting pen cannot be obtained. Accordingly, the infrared source controller 105 suspends the infrared laser diode 25 of the infrared scanning beam generator 12a (12b) from emitting light provided that there is an input of the reference timing signal 95a (95b) from the reference sensor 17a (17b) followed by an input of the pen-press/timing signal 104.

When two types of time count values are input from the resister 96 in response to one reference timing signal 95a (95b), the operation circuit 100 processes the latter time count value as the true value. Where the operation circuit 100 refers to the reference timing signal 95a (95b), a time count value input into the operation circuit 100 from the resister 96 without the input of the reference timing signal 95a (96b) is unread as an invalid value.

FIGS. 12A to 12H are diagrams showing codes of the optical signals 19 that vary depending on the states of the coordinates-inputting pen 13. FIG. 12A shows a state where the pen 13 is not used for drawing. In this state, the optical signal 19 is not generated.

FIG. 12B shows a state where the coordinates-inputting pen 13 is pressed against the board 11 to start drawing. In this state, as described with reference to FIG. 8, the pen-press code 72 indicating that the pen-press switch 36 is ON and a pseudo-timing code 71 based on a signal obtained by clipping the pen-press switch on signal at the clipping circuit 57 appear in the optical signal 19. The code recognition codes 75, 77 and 78 appear at last.

Upon receiving a detection signal with these codes from the light receiver 20, the infrared controller 105 (see FIG. 11) of the code modulating circuitry mounted on the electronic board controller 14 allows the infrared laser diode 25 of one of the infrared scanning beam generators 12a and 12b, for example, the infrared scanning beam 12a at the upper left corner, to emit light so as to generate an infrared scanning beam 18a. The operation circuit 100 skips reading the calculated coordinates information of the coordinates-inputting pen 13 as invalid information.

FIG. 12C shows a state where the coordinates-inputting pen 13 detected the infrared scanning beam 18a. In this state, the optical signal 19 contains the timing code 71 generated upon detecting the infrared scanning beam 18a, the pen-press code 72 generated when the pen-press switch 36 is ON, and code recognition codes 75, 77 and 78.

When the leading code 71 of this optical signal is detected by the light receiver 20, the time counter 94 that had been counting until then as initiated by the signal from the reference sensor 17a is stopped at the code modulating circuitry shown in FIG. 11, and the count value is transferred to the resister 96. Thereafter, all of the detected codes are transferred from the shift resister 80 to the buffer resister 90. When an ID confirmation signal 92 is generated from the AND circuit 91 to which the codes have been input, the content of the resister 96 is transferred to the operation circuit 100. In addition, the code from the resister 99 is output to the logic circuit 102, which in turn outputs the valid pen-press signal 103 to the operation circuit 100 as well as the pen-press/timing signal 104 to the infrared source controller 105.

Upon input of the reference timing signal 95a from the reference sensor 17a followed by the pen-press/timing signal 104, the infrared source controller 105 judges that the detection of the angle a by the left infrared scanning beam 18a has finished, and suspends the infrared laser diode of the infrared scanning beam generator 12a at the upper left corner from emitting light and allows the infrared laser diode of the infrared scanning beam generator 12b at the upper right corner to emit light. Accordingly, the left infrared scanning beam 18a is suspended while the right infrared scanning beam 18b starts scanning to determine the angle β.

FIG. 12D shows a state where the coordinates-inputting pen 13 detected the right infrared scanning beam 18b. In this state, the optical signal 19 contains the same codes as those shown in FIG. 12C except that the timing code 71 is generated based on detection of the right infrared scanning beam 18b.

Upon detecting this optical signal, the electronic board controller 14 determines the angle β in a similar manner to the detection of the left infrared scanning beam 18a, using the reference timing signal 95b from the reference sensor 17b. Then, the electronic board controller 14 calculates the coordinates of the coordinates-inputting pen 13 using the determined angle β with the previously determined angle α. The coordinates information of the pen 13 is sent from the transmitter 101 to the PC 15. The PC 15 processes the information and displays the trace of the pen via a display projector 16 to show the drawing with the pen 13 on the board 11.

Upon input of the reference timing signal 95b from the reference sensor 17b followed by the pen-press/timing signal 104, the infrared source controller 105 judges that the detection of the angle β by the right infrared scanning beam 18b has finished, and suspends the infrared laser diode of the infrared scanning beam generator 12b at the upper right corner for emitting light and allows the infrared laser diode of the infrared scanning beam generator 12a at the upper left corner to emit light. Accordingly, the right infrared scanning beam 18b is suspended while the left infrared scanning beam 18a starts scanning to determine the angle α.

FIG. 12E shows a state where the coordinates-inputting pen 13 is pressed against the board 11 for drawing while manipulating the first click switch 34. The optical signal 19 in this state contains the timing code 71 generated upon detecting the infrared scanning beam, the pen-press code 72 generated when the pen-press switch 36 is ON, a first click switch ON code 73, and code recognition codes 75, 77 and 78. Upon detecting the optical signal, the electronic board controller 14 sends the first click switch ON information to the PC 15, which in turn carries out processing based on the information. The processing of the coordinates data based on the detection of the timing code 71 and the switching control of the left and right infrared scanning beams 18a and 18b are similar to those described with reference to FIG. 12C or 12D.

FIG. 12F shows a state where the coordinates-inputting pen 13 is pressed against the board 11 for drawing while manipulating the second click switch 35. The optical signal 19 in this state contains the timing code 71 generated upon detecting the infrared scanning beam, the pen-press code 72 generated when the pen-press switch 36 is on, a second click switch ON code 74, and code recognition codes 75, 77 and 78. Upon detecting the optical signal, the electronic board controller 14 sends the second click switch ON information to the PC 15, which in turn carries out processing based on the information. The processing of the coordinates data based on the detection of the timing code 71 and the switching control of the left and right infrared scanning beams 18a and 18b are similar to those described with reference to FIG. 12E.

FIG. 12G shows an optical signal 19 sent out from the coordinates-inputting pen 13 just after the drawing has finished. Since the infrared scanning beam is detected when the coordinates-inputting pen 13 has left the board 11 and the pen-press switch 36 is turned off, the optical signal 19 does not contain the pen-press code and only contains the timing code 71 and the code recognition codes 75, 77 and 78. When this optical signal is detected, neither the valid pen-press signal 103 nor the pen-press/timing signal 104 is output from the logic circuit 102 of the code modulating circuitry (FIG. 11). Accordingly, the electronic board controller 14 does nothing.

FIG. 12H shows a state where the coordinates-inputting pen 13 has completely left the board 11 after the drawing. Since the pen-press switch 36 is off and there is no output from the photodiode 41, the shift resister driving circuit 59 of the electronic circuitry shown in FIG. 8 does not generate an output or sends out the optical signal 19. If such a state continues for a predetermined time (e.g., 5 seconds), the infrared source controller 105 of the code modulating circuitry (FIG. 11) suspends the infrared laser diode 25 (a light source of the infrared scanning beam rotationally scanning over the surface of the board 11) from emitting light and shifts to a stand-by state.

The coordinates-inputting pen 13 has been described above which has a photodetector (photodiode) 42 arranged behind the infrared beam receiver 31. Alternatively, the coordinates-inputting pen may have a photodetecter at the tip of the infrared beam receiver 31. According to the description above, in order to avoid interference between the infrared scanning beams 18a and 18b and the optical signal 19, the wavelengths thereof are made different, and the light receivers 20 and the photodetector 41 of the coordinates-inputting pen 13 are provided with optical filters of different transmitting wavelengths so as to selectively detect necessary light beams, respectively. Alternatively, the infrared scanning beams 18a and 18b, and the optical signal 19 may have the same wavelength but modulated at different frequencies so that they may selectively be detected according to the difference of modulation frequencies (carrier frequencies).

According to the present invention, signals from multiple switches provided on the coordinates-inputting pen and a timing signal upon detecting the infrared scanning beams can be transmitted to the electronic board controller without using a connecting wire. Moreover, the infrared scanning beam for specifying the coordinates of the pen can be generated only during the drawing, thereby enhancing the safety of the electronic board.

What is claimed is:

1. An electronic board system comprising:
    a board including first and second infrared scanning beam generators for alternately generating infrared scanning beams for rotational scanning;
    a coordinates-inputting pen including a photodetector for detecting the infrared scanning beams, a pen-press switch for detecting a pen-press against the board, an electronic circuit for outputting time sequential signals based on the detection signal from the photodetector and the ON/OFF signals of the pen-press switch, and a light-emitting element for generating an optical signal based on the time sequential signals output from the electronic circuit;
    a light receiver arranged at a position away from the coordinates-inputting pen, for detecting the optical signal generated from the light-emitting element of the coordinates-inputting pen; and
    an electronic board controller for calculating the coordinates of the coordinates-inputting pen based on the output of the light receiver.

2. An electronic board system comprising:
    a board including first and second infrared scanning beam generators for alternately generating infrared scanning beams for rotational scanning, a first reference sensor for generating a first reference signal upon detecting the infrared scanning beam generated by the first infrared scanning beam generator, and a second reference sensor for generating a second reference signal upon detecting the infrared scanning beam generated by the second infrared scanning beam generator;
    a coordinates-inputting pen including a photodetector for detecting the infrared scanning beams, a pen-press switch for detecting the pen-press against the board, an electronic circuit for outputting time sequential signals based on a detection signal from the photodetector and an ON/OFF signal from the pen-press switch, and a light-emitting element for generating an optical signal upon receiving the time sequential signals output from the electronic circuit;
    a light receiver arranged away from the coordinates-inputting pen for detecting the optical signal generated from the light-emitting element of the coordinates-inputting pen; and
    an electronic board controller for determining location coordinates of the coordinate inputting pen based on the outputs from the first and second reference sensors and the light receiver.

3. An electronic board system according to claim 1, wherein the coordinates-inputting pen has a click switch, and the electronic circuit outputs time sequential signals based on a detection signal from the photodetector, an ON/OFF signal from the pen-press switch and an ON/OFF signal from the click switch.

4. An electronic board system according to claim 1, wherein the electronic circuit of the coordinates-inputting pen outputs encoded time sequential signals obtained by adding recognition codes to the detection signal from the photodetector and the ON/OFF signal from the click switch.

5. An electronic board system according to claim 4, wherein the electronic board controller calculates coordinates of the coordinates-inputting pen immediately upon receiving a code based on the detection signal from the photodetector of the coordinates-inputting pen, and affirm the calculated coordinates after confirming the recognition code.

6. An electronic board system according to claim 1, wherein a wavelength of the infrared rays generated from the first and second infrared scanning beam generators is different from a wavelength generated from the light-emitting element of the coordinates-inputting pen.

7. An electronic board system according to claim 1, wherein the electronic board controller allows a light source in the infrared scanning beam generator to emit light when the electronic board controller judges that the pen-press signal is ON, and the electronic board controller suspends a light source in the infrared scanning beam generator from emitting light when the electronic board controller judges that the pen-press signal has been OFF for a predetermined time.

8. An electronic board system according to claim 1, wherein the electronic board controller suspends a light source in the first infrared scanning beam generator from emitting light while allowing a light source in the second infrared scanning beam generator to emit light when the electronic board controller judges that a photo detecting signal is generated from the coordinates-inputting pen during the generation of the infrared scanning beam by the first infrared scanning beam generator, and the electronic board controller suspends the light source in the second infrared scanning beam generator from emitting light while allowing the light source in the first infrared scanning beam generator to emit light when the electronic board controller judges that a photodetecting signal is generated from the coordinates-inputting pen during the generation of the infrared scanning beam by the second infrared scanning beam generator.

9. An electronic board system according to claim 1, further comprising a computer for receiving the coordinates information of the coordinates-inputting pen from the electronic board controller, and a display means connected to the computer for displaying a mark on the board based on the coordinates information.

10. A coordinates-inputting pen for inputting coordinates by detecting two infrared scanning beams alternately rotationally scanning in parallel to a surface of a board for specifying location coordinates of a pen, the coordinate inputting pen comprising:
    a shaft;
    a light receiver arranged on the tip of the shaft such that it can move in the shaft direction;
    a pen-press switch for generating ON/OFF signal according to the position of the light receiver in the shaft direction;
    an electronic circuit for outputting encoded time sequential signals obtained by adding recognition signals to the detection signal of the infrared scanning beam by the light receiver and the ON/OFF signal from the pen-press switch; and
    a light-emitting element for generating an optical signal in response to the time sequential signals output from the electronic circuit.

11. A coordinates-inputting pen according to claim 10 wherein the light receiver comprises a transparent conical member with a rough surface and a light-emitting element for detecting an infrared ray scattered inside the conical member.

12. A coordinates-inputting pen according to claim 10 further comprising a click switch, wherein the electronic circuit outputs encoded time sequential signals obtained by adding recognition signals to the detection signal from the light receiver, an ON/OFF signal of the pen-press switch, and the ON/OFF signal of the click switch.

* * * * *